United States Patent
Roof

(10) Patent No.: US 8,576,456 B2
(45) Date of Patent: Nov. 5, 2013

(54) SECONDARY SCAN TO ENSURE TRANSIENT DOCUMENT ERASURE

(75) Inventor: Bryan J. Roof, Newark, NY (US)

(73) Assignee: Xerox Corporation, Norwalk, CT (US)

(*) Notice: Subject to any disclaimer, the term of this patent is extended or adjusted under 35 U.S.C. 154(b) by 1175 days.

(21) Appl. No.: 12/487,066

(22) Filed: Jun. 18, 2009

(65) Prior Publication Data

US 2010/0321740 A1    Dec. 23, 2010

(51) Int. Cl.
| | |
|---|---|
| G06K 15/00 | (2006.01) |
| G06K 9/36 | (2006.01) |
| G06K 9/38 | (2006.01) |
| G06K 9/00 | (2006.01) |
| H04N 1/40 | (2006.01) |
| H04N 1/405 | (2006.01) |
| H04N 1/04 | (2006.01) |

(52) U.S. Cl.
USPC .......... 358/448; 358/2.1; 358/3.03; 358/3.13; 358/474; 382/237; 382/270; 382/319

(58) Field of Classification Search
USPC ............... 358/448, 1.1, 2.1, 2.99, 3.02, 3.22, 358/3.03, 3.13, 498, 465, 466, 501, 505, 358/521, 534, 462, 474, 452, 401; 382/270, 382/237, 252, 274, 276, 278, 282, 319; 355/69, 405, 84, 81, 88
See application file for complete search history.

(56) References Cited

U.S. PATENT DOCUMENTS

| | | | |
|---|---|---|---|
| 5,729,632 A | * | 3/1998 | Tai ............................... 382/237 |
| 6,714,318 B1 | * | 3/2004 | Morris et al. .................. 358/1.9 |
| 2010/0045771 A1 | * | 2/2010 | Arai et al. ..................... 347/262 |

* cited by examiner

*Primary Examiner* — Ngon Nguyen
(74) *Attorney, Agent, or Firm* — MH2 Technology Law Group LLP

(57) ABSTRACT

Systems and methods of ensuring the erasure of transient documents are disclosed. The systems and methods include an imaging device that sends a transient document with a pre-printed image into an erase cycle to attempt to remove the image from the document. After the erase cycle, a scanner scans the transient document and converts the transient document into a digital image. A processor compares bit depths of individual bits of the digital image to a bit depth threshold. Depending on the comparison and a number of completed erase cycles, the transient document enters an additional erase cycle, completes as sufficiently erased, or is rejected as not sufficiently erased.

18 Claims, 4 Drawing Sheets

SECONDARY SCAN TO ENSURE TRANSIENT DOCUMENT ERASURE

FIELD OF THE INVENTION

This invention relates to the field of printing and imaging devices, and more particularly to systems and methods for ensuring the erasure of previously imaged information from a print medium.

BACKGROUND OF THE INVENTION

Paper documents are often promptly discarded after being read. Although paper is relatively inexpensive, the quality of discarded paper documents is enormous and the disposal of these discarded paper documents raises significant cost and environmental issues. As a consequence, it would be desirable that paper documents can be reusable, to minimize cost and environmental issues.

Photochromic paper, also known as erasable paper, provides an imaging medium that can be reused many times to transiently store images and documents. For example, photochromic paper employs photochromic materials to provide an imaging medium for containing desired images. Typically, photochromic materials can undergo reversible or irreversible photoinduced color changes in the photochromic containing imaging layer.

In addition, the reversible photoinduced color changes enable image-writing and image-erasure of photochromic paper in sequence on the same paper. For example, an ultraviolet (UV) light source can be used for inducing image-writing, while a combination of heat and a visible light source can be used for inducing image-erasure. However, problems can exist in the erasure process. For example, a chemical formulation of the photochromic document in combination with the heat and the visible light can fail to erase an image on the document to an acceptable shade or, upon conversion to a digital image, bit depth value. Further, the chemical formulation in combination with the heat and visible light can fail to erase the entire image on the document, resulting in portions or lines of unerased content. In these situations, the document is unacceptable on which to subsequently print.

A need, therefore, exists for systems and methods to ensure the erasure of a document. Further, a need exists for systems and methods to ensure that a document has been sufficiently erased to an acceptable level to be reused for printing purposes.

SUMMARY OF THE EMBODIMENTS

The following presents a simplified summary in order to provide a basic understanding of some aspects of one or more embodiments of the invention. This summary is not an extensive overview, nor is it intended to identify key or critical elements of the invention nor to delineate the scope of the invention. Rather, its primary purpose is merely to present one or more concepts in simplified form as a prelude to the detailed description presented later.

In accordance with the present teachings, a method of ensuring an erasure of a transient document is provided. The method comprises forming a grayscale digital image of the transient document, and determining individual bit depths of the grayscale digital image. The individual bit depths of the grayscale digital image are compared to a bit depth threshold. Finally, a status of the erasure of the transient document is determined based on the comparison.

In accordance with the present teachings, an imaging device for ensuring an erasure of a transient document is provided. The imaging device comprises a scanner configured to form a grayscale digital image of the transient document. Further, the imaging device comprises a processor configured to determine individual bit depths of the grayscale digital image, compare the individual bit depths of the grayscale digital image to a bit depth threshold, and determine a status of the erasure of the transient document based on the comparison.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

It should be noted that some details of the drawings have been simplified and are drawn to facilitate understanding of the inventive embodiments rather than to maintain strict structural accuracy, detail, and scale.

DESCRIPTION OF THE EMBODIMENTS

Reference will now be made in detail to the present embodiments (exemplary embodiments) of the invention, an example of which is illustrated in the accompanying drawings. Wherever possible, the same reference numbers will be used throughout the drawings to refer to the same or like parts.

Various embodiments provide systems and methods that allow for a secondary scan to ensure an erasure of one or more transient documents or other print mediums. In embodiments, an image scanning component of an imaging device can comprise a scan bar and an IR source, such as a quartz bulb, co-located on the scan bar, that can heat the chemical imaging formulation which coats the document and allows for a printable and erasable image pattern. Heating the transient document with the IR source can effect or expedite erasure of an image from the coating. Additionally, the IR source can be enabled simultaneously with the scanning light source to more quickly erase the transient document, or with another light source having a wavelength optimized for erasure.

The imaging device can comprise various components, such as: a separate tray/divider that can store transient documents which are no longer needed (ready to be erased); a separate tray/divider that can hold sheets that have been erased and are ready to be used again; a separate tray/divider that can hold sheets that have not been sufficiently erased; a separate erase mode that can turn on the heater and scan at the necessary rate to erase a document; a separate ensure erase mode that can scan a document to ensure erasure; a user interface that can initiate an erase or an ensure erase sequence; and insulation of an automatic document feeder (ADF) that can minimize energy loss if the heating cycle is long.

The embodiments of the present teachings can manage transient documents to expose them to the necessary wavelengths of light to scan, print, erase, and ensure the erasure of a transient document. The imaging device can be controlled by a microprocessor contained within the device, or it can be controlled by a separate computer or microprocessor which is part of a larger network of devices, such as a plurality of office devices, printing devices, etc. The imaging device can be a multifunction or multipurpose device that can copy, scan, image, and perform other functions on documents as known in the art. Further, the imaging device can be a dual-mode imaging device that can function as a conventional imaging device and can also perform the erasure of transient documents.

Figure 1:
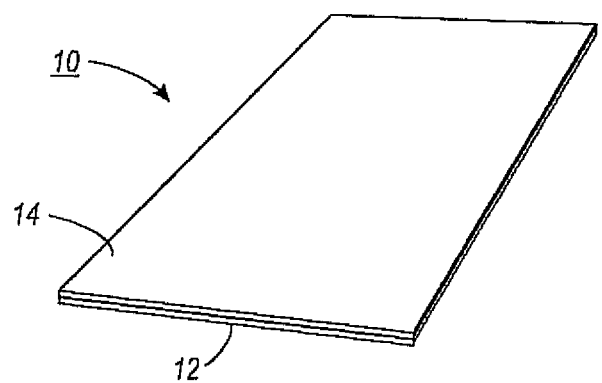
FIG. 1 depicts a perspective depiction of a transient document having a photochromic coating which allows for writing an image in the coating on the page and for erasing an image from the coating according to the present teachings.

FIG. 1 depicts a print medium 10 such as a paper sheet 12 coated, for example, with a reprintable chemical formulation 14 which is the subject of U.S. patent application Ser. No. 12/206,136, which is hereby incorporated by reference in its entirety. The chemical formulation 14 can provide a long lasting image which can be erased in a shorter time than conventional inks. Printing of an image onto the entire sheet can be performed in one exposure by passing the light through a mask pattern using a lens system, or the image can be written or printed serially using a light pen, for example one which comprises the use of a computer-controlled UV laser or light emitting diode (UV LED). Erasing of the image can be performed using a single exposure to one or more of visible light, heat, or IR radiation (or heat supplied through IR radiation), although other erasing techniques are contemplated. For simplicity, the embodiments of the invention discussed herein refer to erasure through IR radiation exposure to heat the transient document, but it will be understood that other or additional erasing techniques are also contemplated and within purview of various embodiments.

Handling of the coated medium (also referred to herein as a "transient document" because of the transient nature of the image printed thereon) is required to expose the coating to UV light to image a pattern on the medium, and to expose the patterned medium to IR radiation to effect erasure of the printed image. A printing apparatus which exposes the formulation-coated medium to UV light to print the image and a separate erasing apparatus which exposes the formulation to IR radiation to erase the image can be used for effective processing of the print medium.

Figure 2:
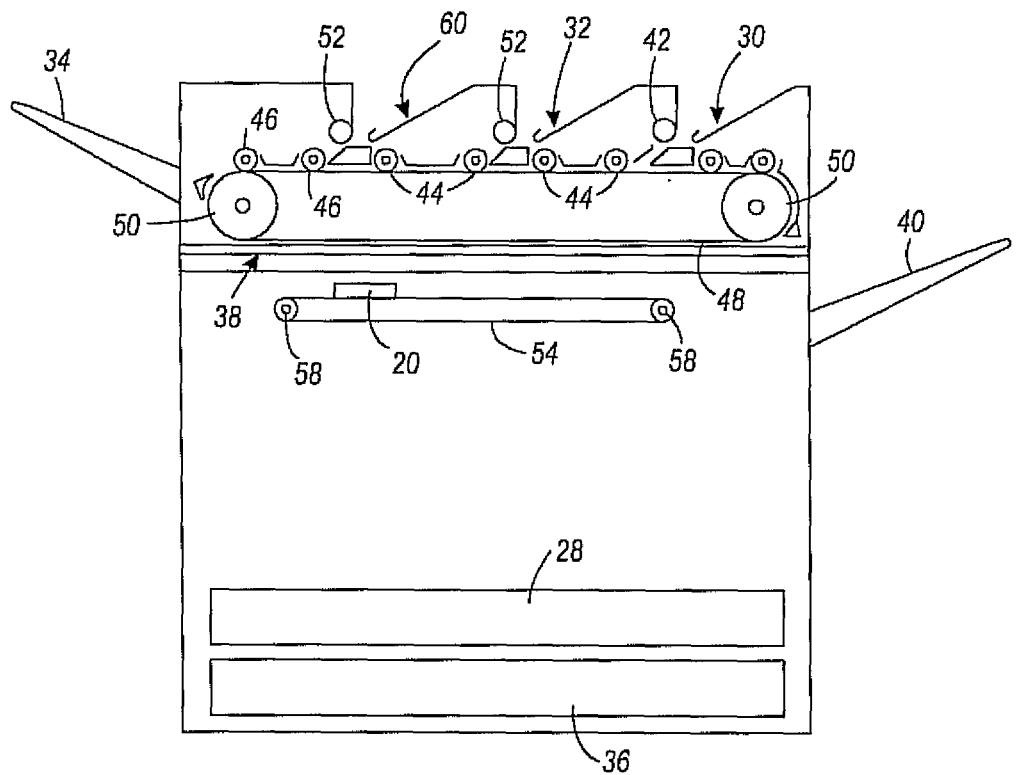
FIG. 2 depicts a cross section depicting an embodiment of an imaging device for handling one or more pages such as that depicted in FIG. 1 according to the present teachings.
Figure 3:
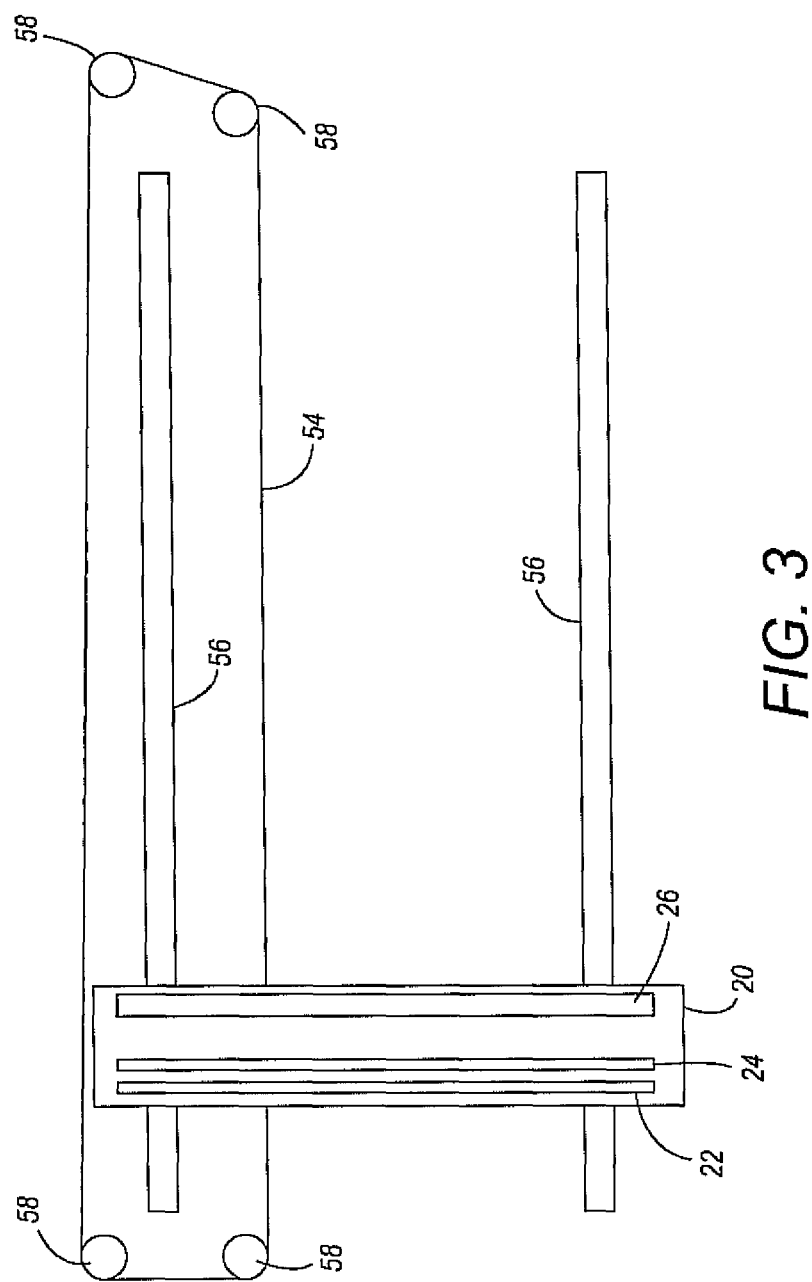
FIG. 3 depicts a plan view of a scan head and drive assembly of an imaging device of the FIG. 2 structure according to the present teachings.

Referring to FIGS. 2 and 3, depicted is an exemplary embodiment of an imaging device. More particularly, FIG. 2 is a cross section depicting an embodiment of the invention comprising an imaging device that serve as a dual-mode imaging device and can copy, scan, image, erase, and ensure the erasure of transient documents such as a paper sheet coated with a photochromic alkoxy modified dithienylethene. FIG. 3 is a plan view detailing a scan head and drive assembly of FIG. 2.

A dual-mode imaging device is preferable over a single-use device, for example to decrease equipment costs and to minimize space requirements. In embodiments, the imaging device can comprise a printing source such as a UV light source for imaging a pattern onto a chemically coated sheet. The imaging device can further comprise an erasing source, such as at least one of a visible light source and heat supplied through an IR light source such as a quartz bulb (quartz halogen heater). The imaging device can also use a third light source having a wavelength which does not image or erase the photochromic material in order to scan a preprinted or an erased document. The imaging device can then perform other functions such as, for example, store the copied document in electronic form, email the electronic copy of the electronic document, use the printing source to print a copy of the document, and/or perform functions associated with an integrated fax machine.

As depicted in FIGS. 2 and 3, the imaging device can be designed so that the transient document page can be placed in a stationary position relative to a moving scan head, such as that found with a flatbed scanner device. In an alternate embodiment, the scan head can remain stationary while the transient document page is moved past the scan head.

As depicted in FIGS. 2 and 3, a scan head 20 can comprise a scanning light source (scan bar) 22 which can comprise a wide spectrum lamp such as a fluorescent or xenon lamp, or a multiple color light emitting diode (LED) emitter array which can provide sufficient illumination of a previously printed or imaged page to allow the device to copy the printed page to a blank transient document or to an electronic file. For example, the scanning light source can provide a visible light wavelength in the range of about 400 nm to about 700 nm and at an intensity sufficient to illuminate the page for copying. The wavelength and intensity of the scanning light source can be sufficient to allow for scanning but not for imaging or erasing, and can depend on the photochromic coating used. In an embodiment using a wide spectrum lamp, filters to remove UV and IR light, as well as other wavelengths which might undesirably erase or write to the photochromic coating, can be provided.

The ink, toner, or photochromic pattern can be electronically coded by a scanner imager photodetector 24, such as a charge coupled device (CCD), a CMOS imager, or a contact image sensor (CIS). A CCD array, for example, can collect reflected photons from the image via mirrors (not individually depicted). In the case of the wide spectrum lamp, RGB filters can be employed, and photons can be collected on the CCD in grayscale, then a color image can be produced by analyzing the number of photons reflected (absorbed) when each filter is used for a specific location on the page. From this information, an RGB colormap can be produced to result in a color image. In the case of an LED array outputting a number of different wavelengths, the spectrum can be narrow for each LED. To build a colormap with an LED array, one or more red LEDs are activated and the number of reflected photons received by the CCD array is analyzed to, for example, count the red depth. The process is then repeated to determine the green depth and the blue depth. The depth of each wavelength is analyzed to result in a color image. It is to be understood that many variants are possible to produce a color, grayscale, or black and white image.

In present embodiments, the scanner image photodetector 24 can produce a digital image in the form of a bitmap represented by multiple bits of tonal information, usually between 2 to 8 (or more) bits per pixel. For example, a grayscale bitmap can comprise 8 bits per pixel, resulting in 256 tonal options. The tones of a greyscale image with a bit depth of 8 ranges from 0 (black) to 255 (white) as well as the 254 in between shades of gray. In the present embodiments, the scanner image photodetector 24 can detect grayscale images with a bit depth of 8, however it should be understood that different digital images with different bit depths can be employed with the systems and methods described herein.

The imaging device can further comprise an erasing light source (erase bar) 26 such as a thermal (heat) source supplied by IR radiation or a visible light source which is sufficient to erase a printed image from the transient document. An exemplary IR light source can comprise a quartz bulb (quartz halogen heater) which can output a wavelength of ≥1100 nm at an intensity and duration sufficient to erase the image from the photochromic coating. To expedite the erasing of a transient document, more than one light source, such as activation of both an IR light source 24 and the scanning light source 22, can be utilized. To further decrease the time to erase the document, the intensity of the scanning light source can be increased during erasure, or both the IR source and a different light source optimized at a wavelength to minimize erasure time can be used. It may be desirable for the scanning light source to output a minimum intensity during a scan cycle to prevent fading of a transient document image, and to increase the intensity of the scan head during an erase cycle to expedite erasure of the image.

In embodiments, an imaging light source (imaging bar, not individually depicted) such as a UV light source can be provided, for example at a wavelength of ≤400 nm, and at an intensity and duration sufficient to produce an image, which can depend on the characteristics of the photochromic coating used. The imaging light source can be passed through a light mask to pattern the light source to print a desired image on the transient document, or the light source can comprise a light pen such as that provided by a UV laser. In either case, the imaging light source can be patterned and imaged directly on the transient document to print a pattern on the document. In embodiments, the imaging light source is internal to the machine, for example internal to a print engine (not individually depicted) and near the feed tray(s) 28, 36, and not on the scan bar 22. Other configurations can be contemplated. For example, light shielding can be employed to ensure that stray light does not image transient documents near the UV light source.

The imaging device can also comprise a blank page storage area 28, which can be a blank page storage feed tray which stores blank (either unimaged or previously erased) sheets for subsequent use. Further, the device can include an original (printed) page storage area 30 (i.e. a "to be copied" storage tray, for example) for storing one or more pages which are to be scanned and/or copied. Suitable documents to be scanned can include an imaged transient document or a conventional page printed using ink or toner. Once a document is copied, it can be returned to the "to be copied" storage tray 30, or to other trays of the imaging device. If the document to be copied includes more than one page, each page can be copied and serially returned to a tray. In embodiments, the device can also include a separate tray such as a "copy complete" tray (not shown in figures) which receives pages after they have been copied.

The imaging device can also comprise a "to be erased" page storage area 32, for example an erasure storage tray. The "to be erased" storage area 32 can store one or more transient documents having an image which is to be erased and can include sufficient warning indicia that can reduce accidental erasure of documents which are to be copied. The design of the multifunction device can allow for erasure from the "to be erased" storage area 32 and not allow erasure from the "to be copied" storage tray 30. In the alternative, a single tray which functions as both the "to be copied" storage tray 30 and the "to be erased" storage area 32 is also envisioned.

In embodiments, once the documents have been erased, they can be sent to or placed in a "to be checked" storage area 60 which can store one or more transient documents having an image which is to be checked to ensure erasure following an erase cycle. In embodiments, the one or more transient documents can enter a ensure erasure cycle automatically after undergoing an erase cycle. The design of the multifunction device could allow for documents to be drawn for the purpose of ensuring erasure from the "to be checked" storage area 60 and not allow documents to be drawn from the "to be erased" storage area 32 or the "to be copied" storage tray 30. In the alternative, one or more trays which function as a combination of the "to be copied" storage tray 30, the "to be erased" storage area 32, and/or the "to be checked" storage area 60 is also envisioned. Once the documents have been checked to ensure erasure, they can be returned to the "to be checked" storage area 60, sent to the separate erased sheet output tray 34, sent to the feed tray 36 for immediate reuse during subsequent copying, or sent to another tray.

Additionally, the imaging device can comprise an automatic document feeder (ADF) which can perform several document transportation functions. For example, the ADF can transfer a blank page from the blank page storage tray 28 to an imaging location (not individually depicted). At the imaging surface, the imaging light source such as a UV laser can print an image on the blank page. Then, after imaging, the ADF can transport the imaged transient document to a printed page storage area such as a printed page output tray 40.

Further, the ADF can transfer a printed page from the "to be copied" storage tray 30 or the "to be checked" storage area 60 to the scanning surface 38. The scanning light source 22 can illuminate the printed or previously erased page, and the device can scan and/or copy the image onto a blank transient document or to an electronic file for ensuring erasure, or for other functions such as faxing or emailing. Additionally, the ADF can transfer an imaged page from the "to be erased" storage area 32 or the "to be checked" storage area 60 to the scanning surface 38 where the imaged page can be illuminated by the erasing light source 26.

The transport of pages can be performed using a series of rollers. For example, a pickup roller 42 can select one sheet from the "to be copied" storage tray 30, and a series of rollers 44, 46, in conjunction with a rotating drive belt 48 and rollers 50, can transport the sheet to the scanning surface 38. Similarly, a sheet to be erased or to be checked can be selected by pickup rollers 52, and the rollers 44, 46, in conjunction with the drive belt 48 and the drive belt rollers 50, can transport the sheet to the scanning surface 38. The scan head 20 can be moved using a drive assembly comprising a drive belt 54 connected to a drive motor (not depicted) along slide rails 56 using scan head drive belt rollers 58.

The imaging device can also include a control panel comprising, for example, a touchpad or series of buttons which allows user a control and a user-readable setup and status screen. In use, the user can select one or more functions from a number of different functions provided by the imaging device through the use of the control panel. The functions can comprise, for example, copy, erase, and ensure erasure.

To scan a previously printed document such as an ink or toner document or a transient document, for example, the user can place the document to be scanned in the "to be copied" storage tray 30 and select the copy function via the control panel. The ADF can subsequently transfer the document to be printed to the scanning surface 38 over the scan head 20, where the scanning source 22 can illuminate the document sufficiently for scanning. The illuminated, original image pattern can be scanned by the scanner imager 24 such as a CCD array and can be stored in memory (not individually depicted) within the device.

If the copied document is to be printed as a transient document, after scanning and storing the image, the document to be copied can be returned to the "to be copied tray" 30 and the print engine can transport a blank page from the blank page feeder tray 28 to the imaging location, for example at a location internal to the device near the feeder tray(s). The original image pattern can be retrieved from memory and imaged onto the transient document using the imaging light source. Imaging can be performed using a microprocessor for processing of the image and control of the imaging source, such as a UV laser, to print the image on the photochromic coating 14 on the transient document sheet 10. Once printed, each transient document page can be transported by the ADF to the printed page output tray 40.

In an alternative to printing a scanned document (or in addition to printing the scanned document), the stored original image can be copied to a file for later use (e.g. ensuring erasure, faxing, emailing, printing, etc.) or can be immediately faxed, emailed, etc. via information supplied by the user through the control panel.

In another embodiment, the device can scan the document to be copied and begin printing the scanned image on the blank transient document prior to completing the scan. Because, in this embodiment, the scanning source and the imaging source are at different locations of the device, this assists in minimizing the time from initiating the scan to completing the copy.

To erase a transient document, a user can place the page(s) to be erased in the "to be erased" storage area 32. After selecting the erase function from the control panel, the ADF can select each page in turn using the pickup roller 52 and transport each page to be erased to the erase light source 26 where the document can be illuminated (for example, using the IR light source 26 to heat the document and the scanning light source 22 to minimize erase time) to erase the document. The rate of movement of the scan head during erasure may be different than the rate of movement during scanning to ensure complete erasure in a minimum time. The conditions necessary to effect complete erasure of the document may vary depending on the chemical formulation used to coat the transient document. After erasing the document, the erased page can be transported by the ADF to the "to be checked" storage area 60, or to other trays.

To check or ensure the erasure of a transient document, a user can place the page(s) to be checked in the "to be checked" storage area 60. After selecting the check or ensure erasure function from the control panel, the ADF can select each page in turn using the pickup roller 52 and transfer the page to be checked to the scanning surface 38 over the scan head 20, where the scanning source 22 can illuminate the document sufficiently for obtaining a grayscale bitmap, as described herein. The bitmap values of the respective page can be compared to preset values to determine if the respective page needs to enter an erase cycle. If the page needs to enter an erase cycle, the ADF can transport the page to the erase light source 26 where the page can undergo an erase cycle, as described herein. After sending the page through an erase cycle, the erased page can be transported by the ADF to the "to be checked" storage area 60, to the scanning surface 38, or to other trays. If the respective page does not need to enter an erase cycle, the ADF can transport the page to the separate erased sheet output tray 34, to the feed tray 36 for immediate reuse during subsequent copying, or to another tray.

Figure 4:
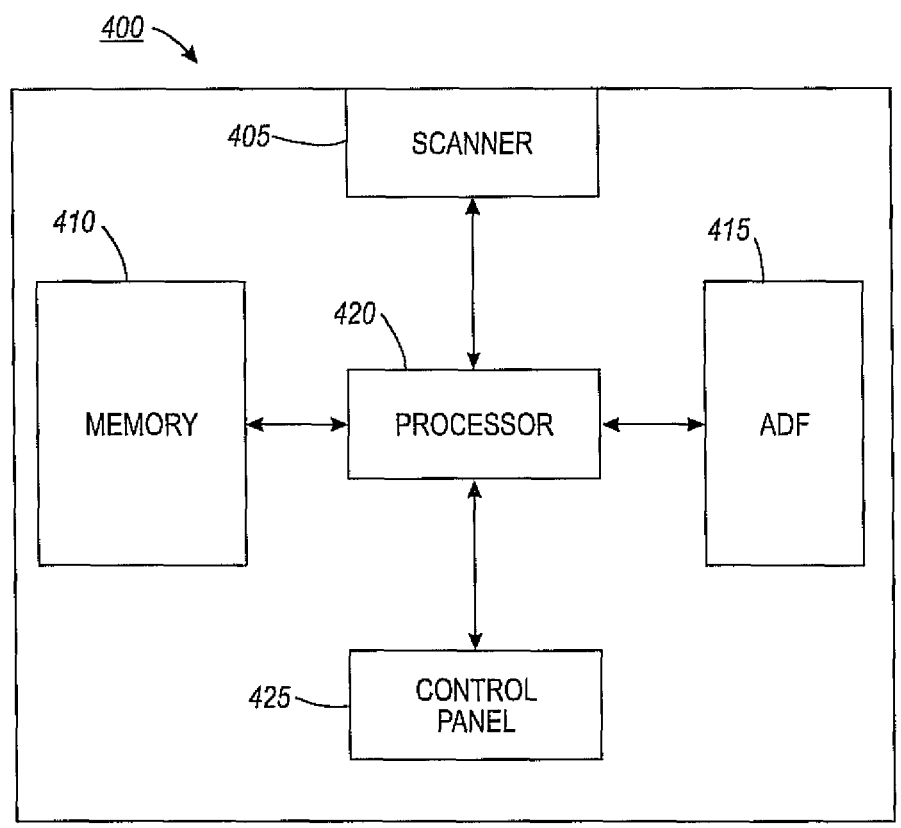
FIG. 4 depicts an exemplary hardware diagram of an imaging device according to the present teachings.

FIG. 4 depicts an exemplary block diagram of an imaging device 400. The imaging device 400 generally refers to a dual-mode imaging device that can print, erase, copy, fax, scan, and ensure erasure of transient documents. However, it should be appreciated that the imaging device 400 can be a standalone device capable of handing the functions associated with transient documents, such as, for example, erasing and ensuring the erasure of transient documents. Generally, these devices also include a network connection, either a local area connection (LAN) such as an Ethernet interface, or a modem that can connect to a phone line (not shown in figures).

The imaging device 400 can comprise a scanner 405, a memory 410, and an ADF 415. The scanner 405 can allow the imaging device 400 to scan hard copy original documents, generate bitmap images of the documents, save the documents and bitmap images in the memory 410, produce a printed copy of the original images via a printer, and/or other functions known in the art. The ADF 415 can transport pages of documents throughout the imaging device 400 consistent with implementations described herein. For example, the ADF 215 can transfer a document to be checked to the scanner 405.

The imaging device 400 can further comprise a processor 420 that can direct the functions of the imaging device 400 as described herein. For example, the processor 420 can obtain or retrieve bitmap data from the scanned document via the scanner 405, and perform calculations on the bitmap data to determine if the document is sufficiently erased. The processor 420 can further direct the ADF 415 to transport a document depending on the results of the calculations, consistent with embodiments described herein. The processor can be coupled to a control panel 425 comprising, for example, a touchpad or series of buttons which can allow a user a control and a user-readable setup and status screen. In use, the user can select one or more functions from a number of different functions provided by the imaging device 400 through the use of the control panel 425. For example, the user can select to check a document for erasure via the control panel 425.

Figure 5:
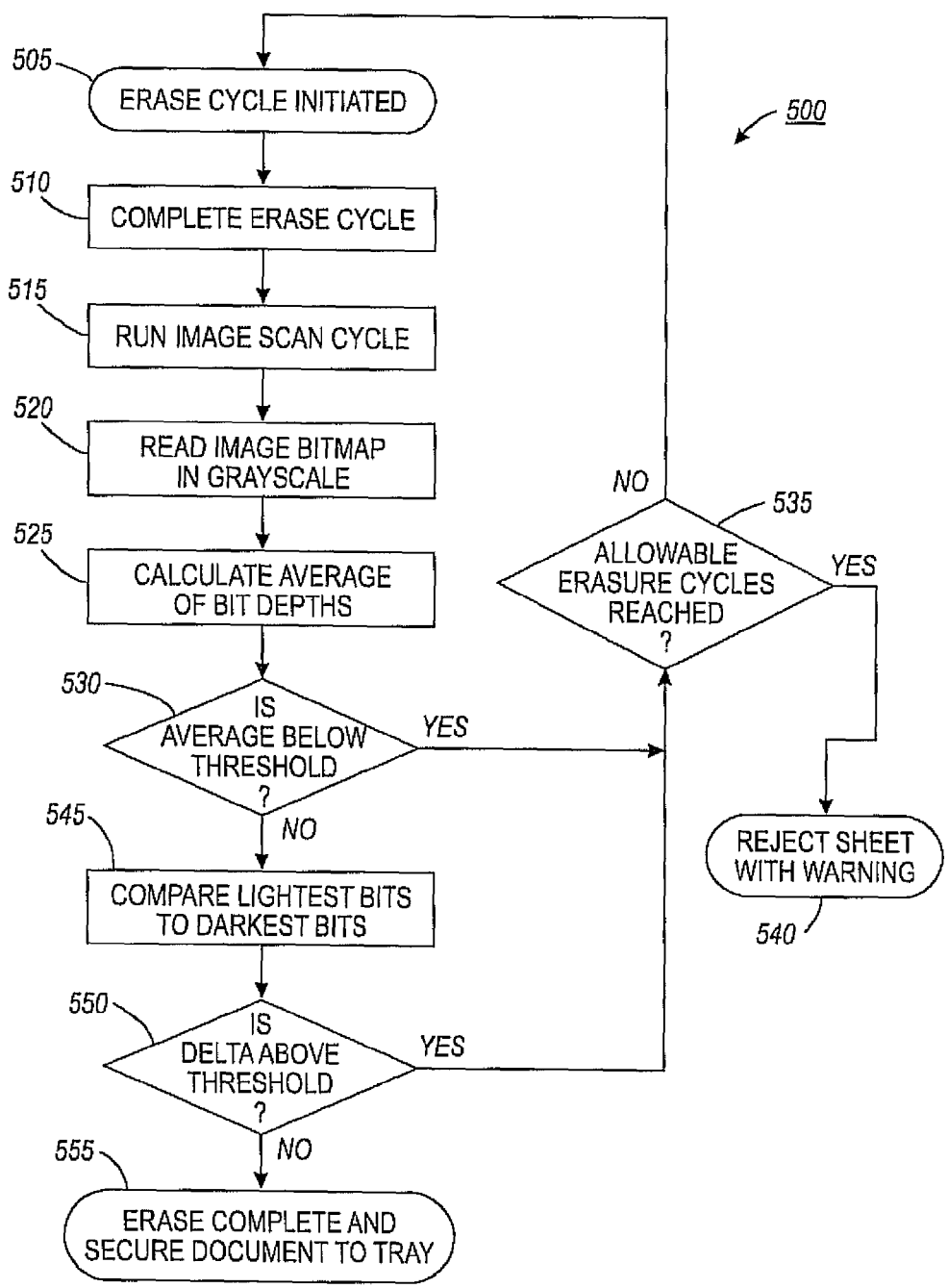
FIG. 5 depicts an exemplary flow diagram of ensuring the erasure of a transient document according to the present teachings.

Referring to FIG. 5, a present embodiment for an exemplary method 500 for ensuring the erasure of a transient document is depicted. It should be appreciated that the mechanical and electronic components of the imaging device can perform the steps of the method 500 such as, for example, the processor 420, the scanner 405, the memory 410, the ADF 415, and other components.

In 505, an erase cycle can initiate. In embodiments, the erase cycle can be any system or method of erasing an image from a document or other medium, such as the embodiments discussed with respect to FIGS. 2 and 3. The erase cycle can initiate when a document is located in the "to be erased" storage area 32, and a user of the imaging device selects an erase function via the control panel of the imaging device. In 510, the erase cycle can complete. In embodiments, once the document completes the erase cycle, the document can be transported by the ADF to the "to be checked" storage area 60. However, it should be appreciated that the document can be transported by the ADF to other trays and areas such as the "to be erased" storage area 32 or the "to be copied" storage tray 30, or directly to the scanning surface 38. Further, the imaging device can maintain a counter for a number of erase cycles that a document has undergone, and the imaging device can increment the counter for each completed erase cycle.

In 515, an image scan cycle can be run. In embodiments, if the document is transported to the "to be checked" storage area 60 or to other trays and areas, the user can initiate a check or ensure document erasure (image scan cycle) function via the control panel. In further embodiments, the image scan cycle can initiate automatically after the erase cycle completes via the ADF transporting the document directly to the scanning surface 38. In 520, the imaging device can read an image bitmap of the document in grayscale. For example, every pixel of the image bitmap can have 8 bits of storage resulting in 256 different bit depths, 0 to 255, each corresponding to a gray level, as explained herein. The imaging device can obtain the bit depths of each pixel on the document and store the bit depths in memory. In embodiments, other systems and methods to obtain image properties of a document can be employed such as, for example, obtaining a 24-bit color bitmap.

In 525, the imaging device can calculate the average of the bit depths. In embodiments, the processor of the imaging device can retrieve the bit depths of a corresponding document from memory and calculate the average of the bit depths. In 530, the imaging device can compare the average of the bit depths to a set threshold. It should be understood that the average bit depth threshold can be set to any number of a user or operator's choosing. For example, the user or operator of the imaging device can set a threshold of 245, and an average bit depth above the 245 threshold but below 255 can indicate that the document is uniformly slightly darker than pure white. Further, an average bit depth above the 245 threshold but below 255 can also indicate that there may be sparse or few noticeable dark regions (e.g. some remaining characters or lines) on the document. Both of these cases can indicate an unacceptable result of the erasure process.

If the average bit depth is below the threshold, the process can continue to 535, where the imaging device can compare a number of completed erase cycles from the erase cycle counter to a set threshold of allowable erase cycles. It should be understood that the threshold of allowable erase cycles can be set to any number of a user or operator's choosing. For example, if the threshold of allowable erasure cycles is 2, and the erase cycle has completed only once, then the process can continue to 505 where an additional erase cycle can be initiated. On the contrary, if the number of allowable erasure cycles is 2, and two erase cycles have been completed, then the process can continue to 540, where the imaging device can reject the document with a warning of an unacceptable erasure. In embodiments, the imaging device can print a warning on the document, alert a user via the control panel, or issue a warning in another way. Further, the imaging device can transport the document to a rejected tray (not shown in figures), or to other trays or areas of the imaging device If the average bit depth is above the threshold, the process can continue to 545, where the imaging device can compare the lightest bits in the bitmap of the document to the darkest bits in the bitmap of the document. In embodiments, the imaging device can retrieve bitmap data from memory and calculate the bit depths of the individual bits from the data. It should be understood that the comparison can be for any number of bits. For example, if the number of bits for the comparison is 100, the imaging device can calculate the 100 bits with the 100 highest bit depths and the 100 bits with the 100 lowest bit depths. The imaging device can average the 100 highest bit depths and the 100 lowest bit depths and calculate a bit depth delta representing the difference between the averages. In 550, the imaging device can determine if the bit depth delta is above a threshold. It should be understood that the delta threshold can be any value. For example, if the delta threshold is a bit depth of 40, the average bit depth of the 100 lowest bits is 200, and the average bit depth of the 100 highest bits is 250, then the delta is 50 and therefore above the threshold. If, however, the delta threshold is a bit depth of 40, the average bit depth of the 100 lowest bits is 220, and the average bit depth of the 100 highest bits is 250, then the delta is 30 and therefore below the threshold.

If the delta is above the threshold, the process can continue to 535 where the imaging device can determine if the number of allowable erasure cycles has been reached, as explained herein. On the contrary, if the delta is below the threshold, then the process can continue to 555 where the ensure erase cycle can complete and the document can be secured to a tray.

In embodiments, the document can be transported by the ADF to the erased page tray 34, the blank page feed tray 28, the feed tray 36, or another tray.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of ensuring an erasure of a transient document, comprising:

forming a grayscale digital image of the transient document;

determining individual bit depths of the grayscale digital image;

comparing the individual bit depths of the grayscale digital image to a bit depth threshold;

determining a status of the erasure of the transient document based on the comparison;

comparing a number of completed erase cycles to a number of allowable erase cycles if the individual bit depths is below the bit depth threshold; and issuing a warning for the transient document if the number of completed erase cycles is equal to or greater than the number of allowable erase cycles.

2. The method of claim 1, further comprising:
initiating an erase cycle for the transient document if the individual bit depths is below the bit depth threshold.

3. The method of claim 1, further comprising:
completing the erasure of the transient document if the individual bit depths is above the bit depth threshold.

4. The method of claim 3, wherein the step of completing the erasure of the transient document comprises sending the transient document to a tray.

5. The method of claim 1, wherein the step of comparing the individual bit depths of the grayscale digital image to the bit depth threshold comprises:
calculating an average of the individual bit depths; and
comparing the average of the individual bit depths to the bit depth threshold.

6. The method of claim 1, further comprising:
selecting a plurality of lowest individual bit depths from the individual bit depths of the grayscale digital image and a plurality of highest individual bit depths from the individual bit depths of the grayscale digital image; and
initiating an erase cycle for the transient document if a difference between an average of the plurality of lowest individual bit depths and an average of the plurality of highest individual bit depths is above a threshold.

7. The method of claim 1, wherein the step of forming the grayscale digital image of the transient document is done after the transient document has completed an erase cycle.

8. The method of claim 1, wherein the grayscale digital image is an 8-bit grayscale bitmap image.

9. The method of claim 1, further comprising:
receiving a function request from a control panel.

10. An imaging device for ensuring an erasure of a transient document, comprising:
a scanner configured to form a grayscale digital image of the transient document; and
a processor configured to determine individual bit depths of the grayscale digital image, compare the individual bit depths of the grayscale digital image to a bit depth threshold, determine a status of the erasure of the transient document based on the comparison, compare a number of completed erase cycles to a number of allowable erase cycles if the individual bit depths is below the bit depth threshold, and issue a warning for the transient document if the number of completed erase cycles is equal or greater than the number of allowable erase cycles.

11. The device of claim 10, wherein the processor is further configured to initiate an erase cycle for the transient document if the individual bit depths is below the bit depth threshold.

12. The device of claim 10, wherein the processor is further configured to complete the erasure of the transient document if the individual bit depths is above the bit depth threshold.

13. The device of claim 12, further comprising an automatic document feeder configured to send the transient document to a tray upon the completion of the erasure of the transient document.

14. The device of claim 10, wherein the processor, in comparing the individual bit depths of the grayscale digital image to the bit depth threshold, is configured to:
calculate an average of the individual bit depths; and
compare the average of the individual bit depths to the bit depth threshold.

15. The device of claim 10, wherein the processor is further configured to:
select a plurality of lowest individual bit depths from the individual bit depths of the grayscale digital image and a plurality of highest individual bit depths from the individual bit depths of the grayscale digital image; and
initiate an erase cycle for the transient document if a difference between an average of the plurality of lowest individual bit depths and an average of the plurality of highest individual bit depths is above a threshold.

16. The device of claim 10, wherein the scanner forms the grayscale digital image of the transient document after the transient document has completed an erase cycle.

17. The device of claim 10, wherein the grayscale digital image is an 8-bit grayscale bitmap image.

18. The device of claim 10, wherein the imaging device is implemented as part of a dual-mode imaging system.

* * * * *